(12) United States Patent
Lukacs et al.

(10) Patent No.: US 9,117,081 B2
(45) Date of Patent: Aug. 25, 2015

(54) STRONGLY ISOLATED MALWARE SCANNING USING SECURE VIRTUAL CONTAINERS

(71) Applicant: Bitdefender IPR Management Ltd., Nicosia (CY)

(72) Inventors: Sandor Lukacs, Floresti (RO); Cristian B. Sirb, Alba Iulia (RO); Dan H. Lutas, Cluj-Napoca (RO); Adrian V. Colesa, Cluj-Napoca (RO)

(73) Assignee: Bitdefender IPR Management Ltd., Nicosia (CY)

( * ) Notice: Subject to any disclaimer, the term of this patent is extended or adjusted under 35 U.S.C. 154(b) by 0 days.

(21) Appl. No.: 14/135,902

(22) Filed: Dec. 20, 2013

(65) Prior Publication Data

US 2015/0178497 A1    Jun. 25, 2015

(51) Int. Cl.
*G06F 9/45* (2006.01)
*G06F 21/56* (2013.01)
*G06F 9/46* (2006.01)

(52) U.S. Cl.
CPC .............. *G06F 21/567* (2013.01); *G06F 9/461* (2013.01)

(58) Field of Classification Search
CPC ................................................. G06F 9/45533
See application file for complete search history.

(56) References Cited

U.S. PATENT DOCUMENTS

| | | | |
|---|---|---|---|
| 5,960,170 A | 9/1999 | Chen et al. | |
| 6,195,587 B1 | 2/2001 | Hruska et al. | |
| 6,807,665 B2 | 10/2004 | Evans et al. | |
| 6,963,978 B1 | 11/2005 | Muttik et al. | |
| 7,020,895 B2 | 3/2006 | Albrecht | |
| 7,203,959 B2 | 4/2007 | Nachenberg et al. | |
| 7,257,842 B2 | 8/2007 | Barton et al. | |
| 7,302,706 B1 | 11/2007 | Hicks et al. | |
| 7,337,471 B2 | 2/2008 | Nachenberg et al. | |
| 7,383,580 B1 | 6/2008 | Frentz | |
| 7,412,450 B1 | 8/2008 | Bonwick et al. | |
| 7,631,196 B2 | 12/2009 | Kozuch et al. | |
| 7,757,291 B2 | 7/2010 | Rochette et al. | |
| 7,797,748 B2 | 9/2010 | Zheng et al. | |
| 7,840,793 B2 | 11/2010 | Wang | |
| 8,127,358 B1 | 2/2012 | Lee | |
| 8,151,352 B1 | 4/2012 | Novitchi | |

(Continued)

OTHER PUBLICATIONS

McIntosh, "Xensocket: Interdomain transport for VMs," Xen Summit 2007, New York, NY, p. 1-18, Apr. 17, 2007.

(Continued)

*Primary Examiner* — Josnel Jeudy
(74) *Attorney, Agent, or Firm* — Law Office of Andrei D Popovici, PC

(57) ABSTRACT

Described systems and methods allow protecting a host system, such as a computer or smartphone, from malware. In some embodiments, an anti-malware application installs a hypervisor, which displaces an operating system executing on the host system to a guest virtual machine (VM). The hypervisor further creates a set of virtual containers (VC), by setting up a memory domain for each VC, isolated from the memory domain of the guest VM. The hypervisor then maps a memory image of a malware scanner to each VC. When a target object is selected for scanning, the anti-malware application launches the malware scanner. Upon intercepting the launch, the hypervisor switches the memory context of the malware scanner to the memory domain of a selected VC, for the duration of the scan. Thus, malware scanning is performed within an isolated environment.

15 Claims, 9 Drawing Sheets

(56) References Cited

U.S. PATENT DOCUMENTS

| | | | |
|---|---|---|---|
| 8,307,443 | B2 | 11/2012 | Wang et al. |
| 8,312,476 | B2 | 11/2012 | Chin et al. |
| 8,326,943 | B2 | 12/2012 | Chinta et al. |
| 8,341,631 | B2 | 12/2012 | Havemose |
| 8,352,964 | B2 | 1/2013 | Laborczfalvi et al. |
| 8,407,717 | B2 | 3/2013 | Ho |
| 8,424,078 | B2 | 4/2013 | Accapadi et al. |
| 8,479,295 | B2 * | 7/2013 | Sahita et al. ............ 726/24 |
| 8,539,582 | B1 | 9/2013 | Aziz et al. |
| 2001/0005889 | A1 | 6/2001 | Albrecht |
| 2004/0098473 | A1 | 5/2004 | Yodaiken |
| 2004/0205419 | A1 | 10/2004 | Chen et al. |
| 2007/0234355 | A1 | 10/2007 | Locker et al. |
| 2007/0240221 | A1 | 10/2007 | Tuvell et al. |
| 2007/0266436 | A1 | 11/2007 | Ballard et al. |
| 2008/0066075 | A1 | 3/2008 | Nutter et al. |
| 2008/0148407 | A1 | 6/2008 | Katkar |
| 2008/0168564 | A1 | 7/2008 | Lerouge et al. |
| 2009/0007100 | A1 | 1/2009 | Field et al. |
| 2009/0037936 | A1 * | 2/2009 | Serebrin ............ 719/318 |
| 2009/0158432 | A1 * | 6/2009 | Zheng et al. ............ 726/24 |
| 2009/0172820 | A1 | 7/2009 | Watson |
| 2009/0249470 | A1 | 10/2009 | Litvin et al. |
| 2009/0249472 | A1 | 10/2009 | Litvin et al. |
| 2009/0293125 | A1 | 11/2009 | Szor |
| 2009/0300607 | A1 | 12/2009 | Ferris et al. |
| 2010/0198973 | A1 | 8/2010 | Jung et al. |
| 2010/0262752 | A1 * | 10/2010 | Davis et al. ............ 711/103 |
| 2010/0262977 | A1 | 10/2010 | Havemose |
| 2011/0296412 | A1 | 12/2011 | Banga et al. |
| 2012/0198442 | A1 | 8/2012 | Kashyap et al. |
| 2013/0198747 | A1 | 8/2013 | Larkin et al. |

OTHER PUBLICATIONS

Oberheide, Jon et al., "CloudAV: N-Version Antivirus in the Network Cloud," USENIX Security Symposium, San Jose, CA, p. 1-16, Jul. 30, 2008; available at http://www.eecs.umich.edu/fjgroup/pubs/usenix08-cloudav.pdf.

Dinaburg et al., "Ether: Malware Analysis via Hardware Virtualization Extensions," 15th ACM Conference on Computer and Communications Security, Alexandria, Virginia, USA, p. 1-12, Oct. 27-31, 2008.

Hsieh, "Anti-Virus Deployment for VMWare View," VMWare Technical Notes, VMWare, Palo Alto, CA, p. 1-11, retrieved on Mar. 23, 2010; document contains note "Copyright 2009 VMWare".

Chiriac, Mihai, "Tales from Cloud Nine," Virus Bulletin Conference, Geneva, Switzerland, p. 1-46, Sep. 24, 2009; available at http://www.virusbtn.com/pdf/conference_slides/2009/Chiriac-VB2009.pdf.

Nguyen et al., "MAVMM: Lightweight and Purpose Built VMM for Malware Analysis," 2009 Annual Computer Security Applications Conference, Honolulu, Hawaii, USA, p. 1-13, Dec. 7-11 2009.

Altor Networks, "Secure Virtualization for HIPAA Compliance," Altor Networks, Redwood City, CA, p. 1-3, retrieved on Mar. 11, 2010.

Altor Networks, "White Paper: The Need for Virtual Network Analysis," Altor Networks, Redwood City, CA, p. 1-6, retrieved on Mar. 11, 2010.

Altor Networks, "White Paper: Alternatives for Securing Virtual Networks," Altor Networks, Redwood City, CA, p. 1-5, retrieved on Mar. 11, 2010.

Altor Networks, "White Paper: 5 Best Practices to Protect Your Virtual Environment," Altor Networks, Redwood City, CA, p. 1-6, retrieved on Mar. 11, 2010.

Altor Networks, "Secure Virtualized Hosting," Altor Networks, Redwood City, CA, p. 1-4, retrieved on Mar. 11, 2010.

Sahita et al., "Strengthening Platforms Against Malware Attacks Using Intel Virtualization Technology Extensions," 2013 Intel Development Forum, San Francisco, CA, USA, May 22, 2013.

Chiriac et al., U.S. Appl. No. 12/792,317, filed Jun. 2, 2010.

* cited by examiner

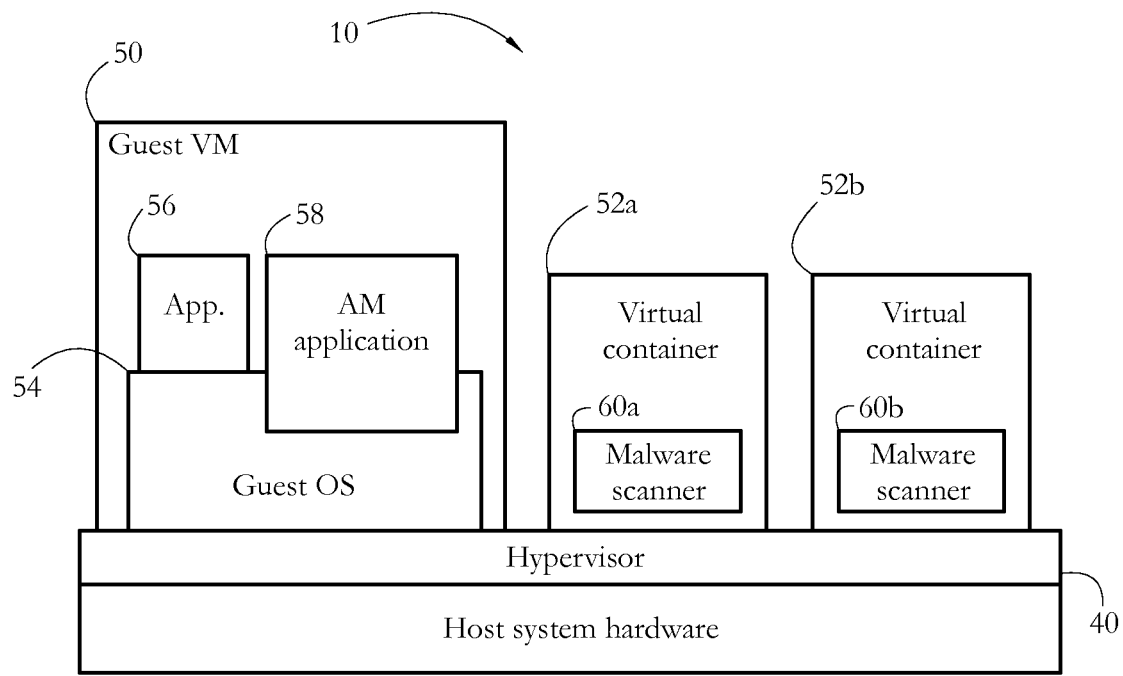
FIG. 1-A
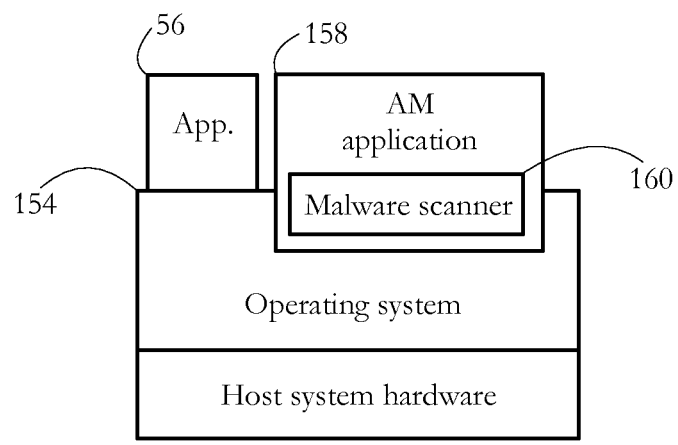
FIG. 1-B (PRIOR ART)

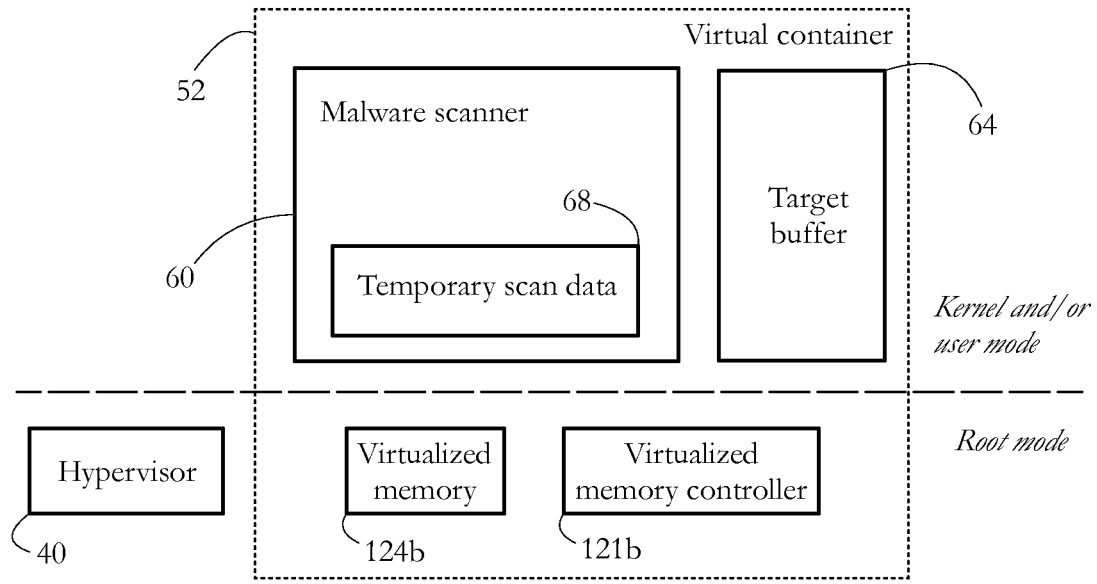
FIG. 5-A
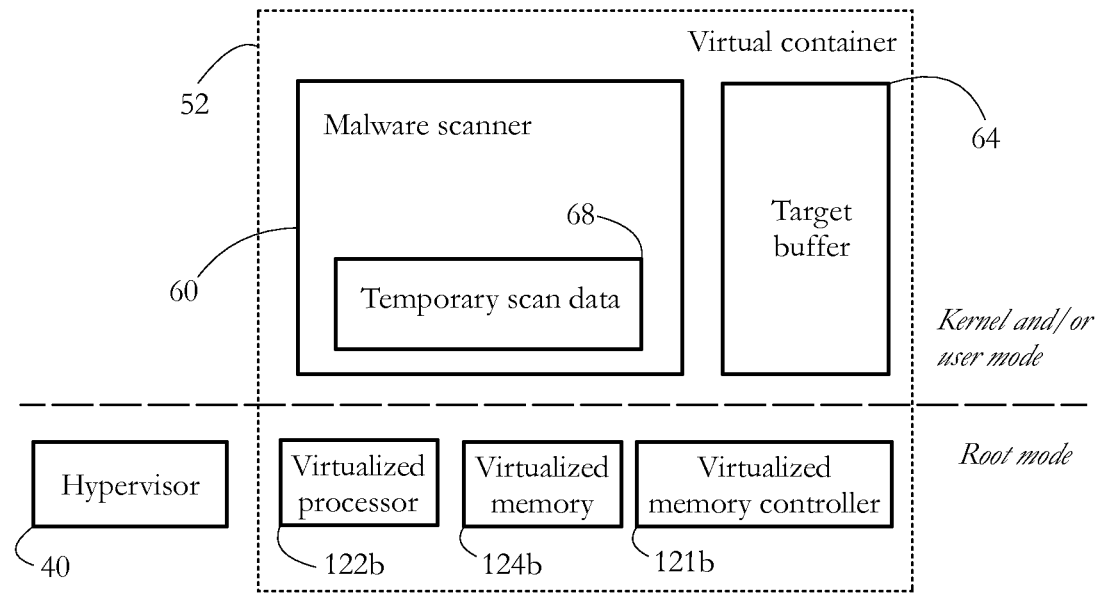
FIG. 5-B

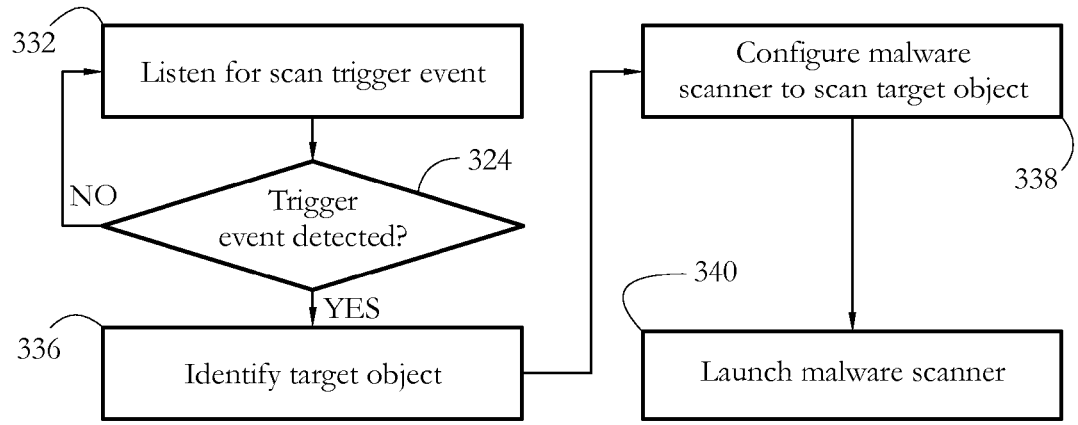
FIG. 10
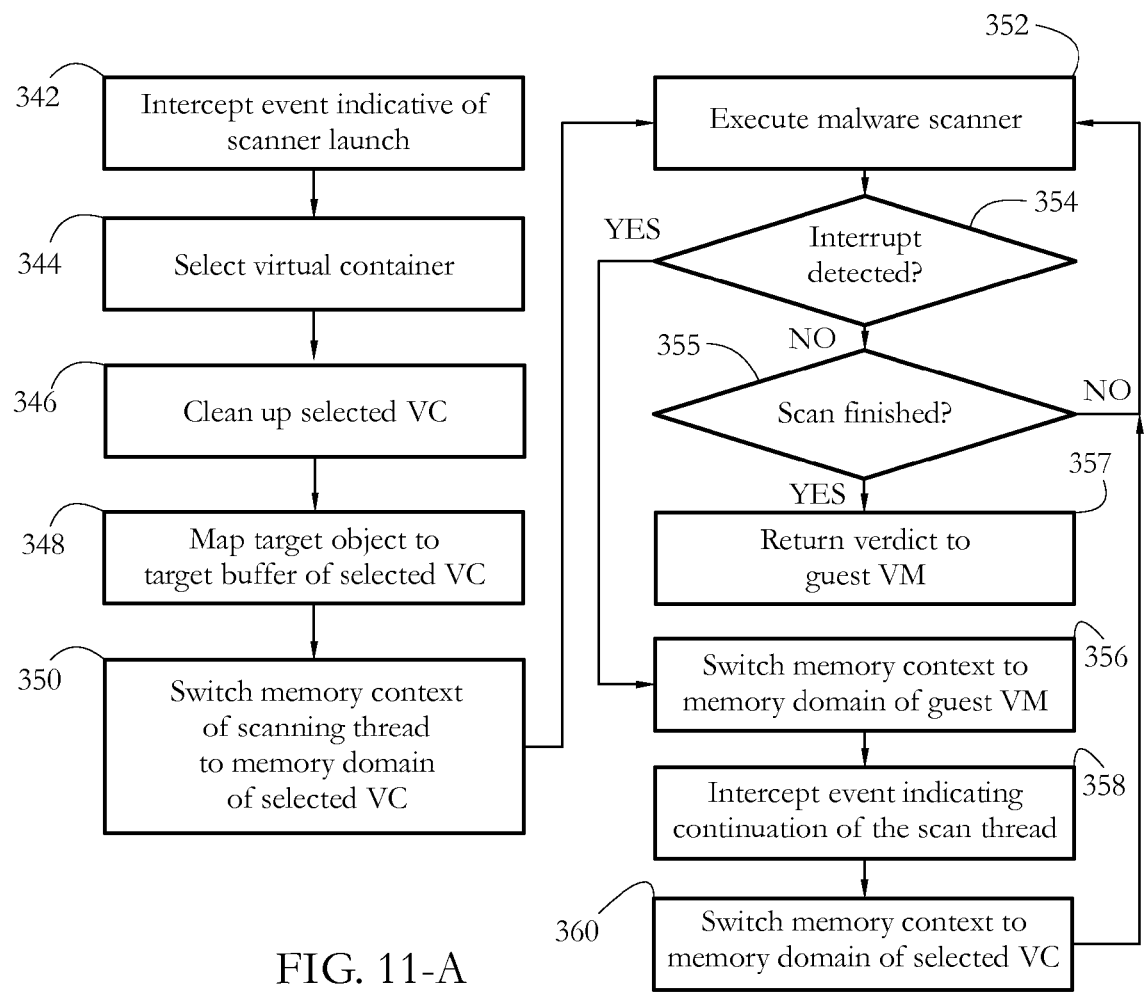
FIG. 11-A

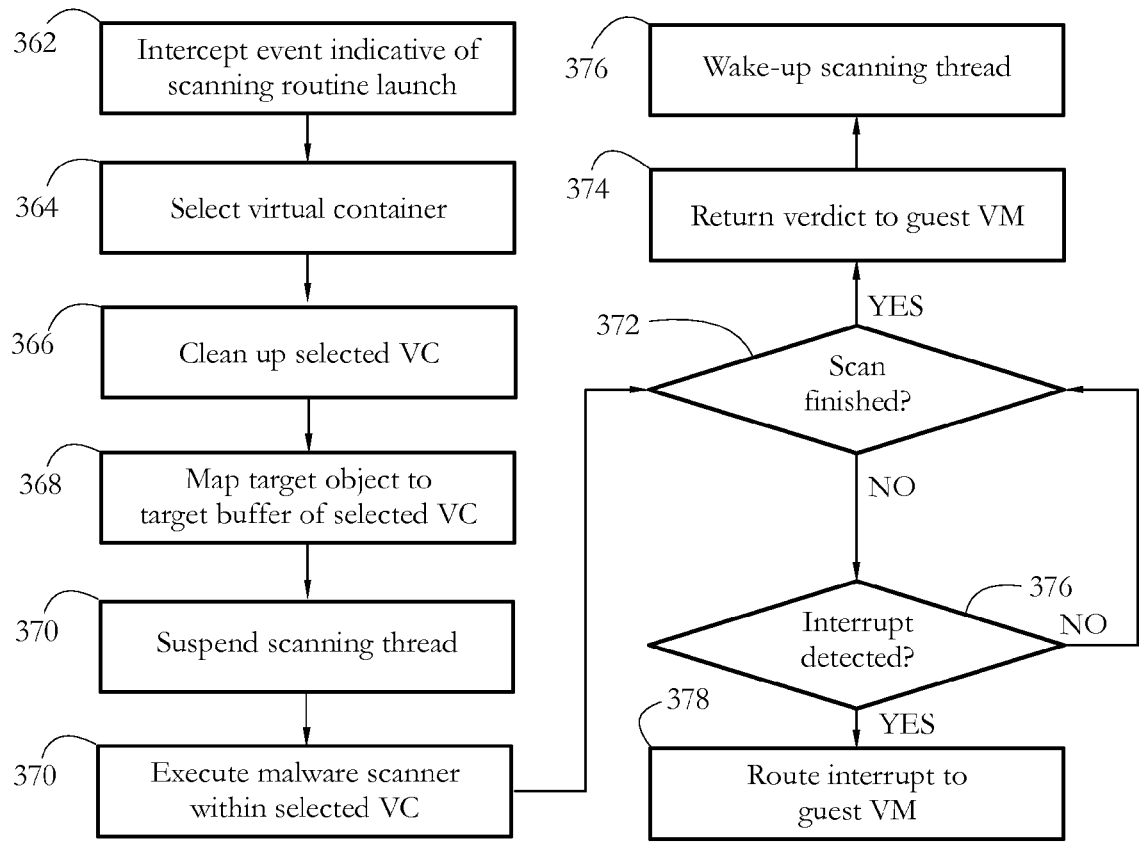
FIG. 11-B

STRONGLY ISOLATED MALWARE SCANNING USING SECURE VIRTUAL CONTAINERS

BACKGROUND

The invention relates to systems and methods for protecting a computer system from malware, and in particular systems and methods that use hardware virtualization technology.

Malicious software, also known as malware, affects a great number of computer systems worldwide. In its many forms such as computer viruses, worms, and rootkits, malware presents a serious risk to millions of computer users, making them vulnerable to loss of data and sensitive information, identity theft, and loss of productivity, among others.

A typical malware attack comprises malware exploiting a vulnerability of a software object, such as an application executing on a computer system or smartphone, to take control of the respective system in order to perform malicious activities, such as installing software components, carrying out illegitimate electronic communications with a remote computer system, and stealing sensitive information, among others.

Various software solutions may be used to detect malware, and/or to prevent such malware from executing on a computer system. Anti-malware software is typically configured to access a much broader range of file and data types than other applications. An exemplary anti-malware application may be able to process executable files, image files, databases, and portable document files (PDF), among others. Handling so many data types may make anti-malware software especially vulnerable to attacks. Moreover, typical anti-malware software executes with relatively high processor privileges, so a successful attack on an anti-malware component may give a substantial advantage to the attacking entity. Anti-malware software may thus be a preferred target for malware.

Hardware virtualization technology allows the creation of simulated computer environments commonly known as virtual machines (VM), which behave in many ways as physical computer systems. A virtual machine may be set up to execute applications in an environment, which is approximately isolated from the environment of another VM, thus increasing data security and privacy. There is considerable interest in developing anti-malware solutions which take advantage of such facilities offered by hardware virtualization technology.

SUMMARY

According to one aspect, a host system comprises at least one processor configured to execute a hypervisor, the hypervisor configured to expose a guest virtual machine (VM) and a virtual container (VC), wherein exposing the VC includes setting up a memory domain of the VC, the memory domain of the VC isolated from a memory domain of the guest VM. The guest VM is configured to execute a malware scanner on a virtualized processor of the guest VM, the malware scanner configured to scan a target object for malware. The hypervisor is further configured, in response to setting up the memory domain of the VC, to map a memory page containing a part of the malware scanner to a memory page within the memory domain of the VC, and in response to a launch of the malware scanner by the guest VM, to switch a memory context of the malware scanner from the memory domain of the guest VM to the memory domain of the VC.

According to another aspect, a method comprises employing at least one processor of a host system to execute a hypervisor, the hypervisor configured to expose a guest virtual machine (VM) and a virtual container (VC), wherein exposing the VC includes setting up a memory domain of the VC, the memory domain of the VC isolated from a memory domain of the guest VM. The method further comprises, in response to exposing the guest VM, employing the at least one processor to configure the guest VM to execute a malware scanner on a virtualized processor of the guest VM, the malware scanner configured to scan a target object for malware. The method further comprises, in response to setting up the memory domain of the VC, employing the at least one processor to map a memory page containing a part of a malware scanner to a memory page within the memory domain of the VC. The method further comprises employing the at least one processor to launch the malware scanner and in response to launching the malware scanner, employing the at least one processor to switch a memory context of the malware scanner from the memory domain of the guest VM to the memory domain of the VC.

According to another aspect, a non-transitory computer readable medium stores instructions which, when executed, cause a host system comprising at least one processor to execute a hypervisor, the hypervisor configured to expose a guest virtual machine (VM) and a virtual container (VC), wherein exposing the VC includes setting up a memory domain of the VC, the memory domain of the VC isolated from a memory domain of the guest VM. The guest VM is configured to execute a malware scanner on a virtualized processor of the guest VM, the malware scanner configured to scan a target object for malware. The hypervisor is further configured, in response to setting up the memory domain of the VC, to map a memory page containing a part of the malware scanner to a memory page within the memory domain of the VC, and in response to a launch of the malware scanner by the guest VM, to switch a memory context of the malware scanner from the memory domain of the guest VM to the memory domain of the VC.

According to another aspect, a host system comprises at least one processor configured to execute a hypervisor, the hypervisor configured to expose a guest virtual machine (VM) and a virtual container (VC), wherein exposing the VC includes setting up a memory domain of the VC, the memory domain of the VC isolated from a memory domain of the guest VM. The guest VM is configured to launch a malware scanner configured to scan a target object for malware. The hypervisor is further configured, in response to setting up the memory domain of the VC, to map a memory page containing a part of the malware scanner to a memory page within the memory domain of the VC, and in response to a launch of the malware scanner by the guest VM, to switch execution of the malware scanner from a virtualized processor of the guest VM to a virtualized processor of the VC. The hypervisor is further configured, in response to switching execution of the malware scanner to the virtualized processor of the VC, to intercept a hardware interrupt configured to suspend the execution of the malware scanner, and in response, to redirect the hardware interrupt to the virtualized processor of the guest VM.

BRIEF DESCRIPTION OF THE DRAWINGS

The foregoing aspects and advantages of the present invention will become better understood upon reading the following detailed description and upon reference to the drawings where:

FIG. 1-A shows an exemplary configuration of a host system protected from malware according to some embodiments of the present invention, the host system comprising a guest virtual machine (VM) and a set of virtual containers (VC).

FIG. 1-B shows an exemplary configuration used in conventional anti-malware systems not employing hardware virtualization technology.

FIG. 4 is represented from the perspective of processor privilege levels.

FIG. 5-A illustrates exemplary components of a virtual container according to some embodiments of the present invention.

FIG. 5-B illustrates an alternative embodiment of a virtual container.

FIG. 10 shows an exemplary sequence of steps performed by the anti-malware application to protect the guest VM from malware according to some embodiments of the present invention.

FIG. 11-A shows an exemplary sequence of steps performed by the hypervisor to scan a target object for malware according to some embodiments of the present invention wherein the virtual container lacks a virtual processor.

FIG. 11-B shows an exemplary sequence of steps performed by the hypervisor to scan a target object for malware in an alternative embodiment wherein the virtual container includes a virtual processor.

DETAILED DESCRIPTION OF PREFERRED EMBODIMENTS

Figure 2:
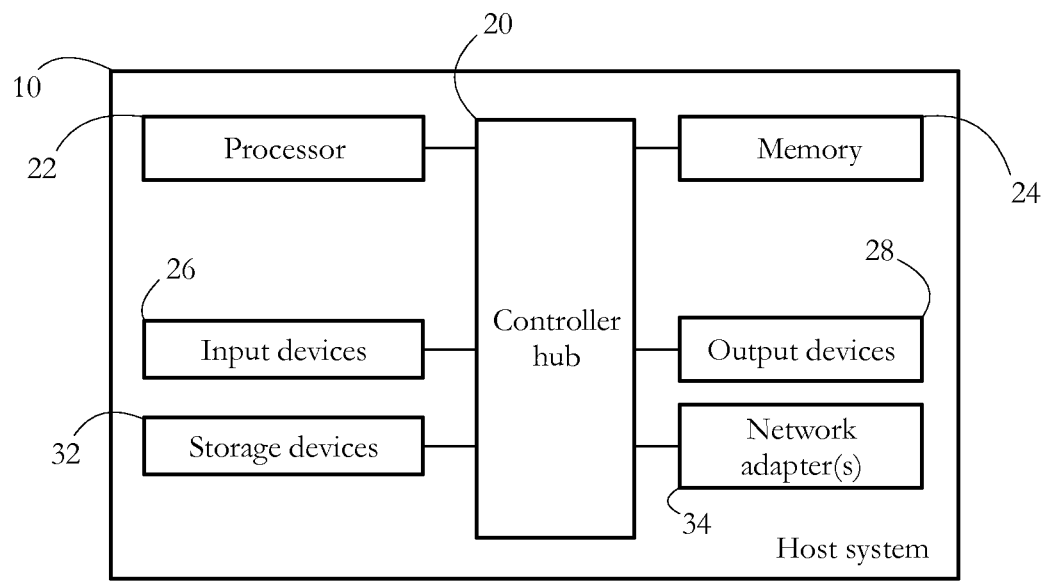
FIG. 2 shows an exemplary hardware configuration of the host system of FIG. 1-A, according to some embodiments of the present invention.

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Unless otherwise specified, a page represents the smallest unit of virtualized memory individually mapped to a physical memory of a host computer system. Computer readable media encompass non-transitory media such as magnetic, optic, and semiconductor storage media (e.g. hard drives, optical disks, flash memory, DRAM), as well as communications links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

FIG. 1-A shows an exemplary configuration of a host system 10 protected from malware according to some embodiments of the present invention. Host system 10 may represent a corporate computing device such as an enterprise server, or an end-user device such as a personal computer, tablet computer, or smartphone, among others. Other exemplary host systems include entertainment devices such as TVs and game consoles, wearable computing devices, or any other electronic device having a memory and a processor, and supporting hardware virtualization. In some embodiments, host system 10 is configured to execute a hypervisor 40, while hypervisor 40 is further configured to expose a guest virtual machine (VM) 50 and a set of virtual containers (VC) 52a-b.

Virtual machine 50 comprises a software emulation of an actual physical computing device (e.g., host system 10), the emulation enabling VM 50 to execute an operating system and/or other software applications. In some embodiments, hypervisor 40, also known in the art as a virtual machine monitor (VMM), comprises software which creates the virtual environment of VM 50, an operation also known in the art of virtualization as exposing VM 50. To expose a virtual machine such as VM 50, software components of hypervisor 40 may create a plurality of virtual devices, each virtual device emulating the operation and functionality of a physical hardware device of host system 10, such as a processor or a memory controller, among others. Hypervisor 40 may further assign a set of virtual devices to each exposed VM, allowing the respective VM to operate as if it possessed a more-or-less complete set of hardware devices. Examples of popular hypervisors include the VMware ESXi™ from VMware Inc. and the open-source Xen hypervisor, among others.

FIG. 2 shows an exemplary hardware configuration of host system 10, according to some embodiments of the present invention. System 10 of FIG. 2 represents a computer system for illustrative purposes; other devices such as smartphones may have a different configuration. In some embodiments, host system 10 comprises a processor 22, a memory unit 24, a set of input devices 26, a set of output devices 28, a set of storage devices 32, and a set of network adapter(s) 34, all interconnected by a controller hub 20.

In some embodiments, processor 22 comprises a physical device (e.g. multi-core integrated circuit) configured to execute computational and/or logical operations with a set of signals and/or data. In some embodiments, such logical operations are delivered to processor 22 in the form of a sequence of processor instructions (e.g. machine code or other type of software). Memory unit 24 may comprise volatile computer-readable media (e.g. RAM) storing data/signals accessed or generated by processor 22 in the course of carrying out instructions. Input devices 26 may include computer keyboards, mice, and microphones, among others, including the respective hardware interfaces and/or adapters allowing a user to introduce data and/or instructions into host system 10. Output devices 28 may include display devices such as monitors and speakers among others, as well as hardware interfaces/adapters such as graphic cards, allowing host system 10 to communicate data to a user. In some embodiments, input devices 26 and output devices 28 may share a common piece of hardware, as in the case of touch-screen devices. Storage devices 32 include computer-readable media enabling the non-volatile storage, reading, and writing of software instructions and/or data. Exemplary storage devices 32 include magnetic and optical disks and flash memory devices, as well as removable media such as CD and/or DVD disks and drives. Network adapter(s) 34 enable host system 10 to connect to a communication network and/or to other devices/computer systems.

Figure 3:
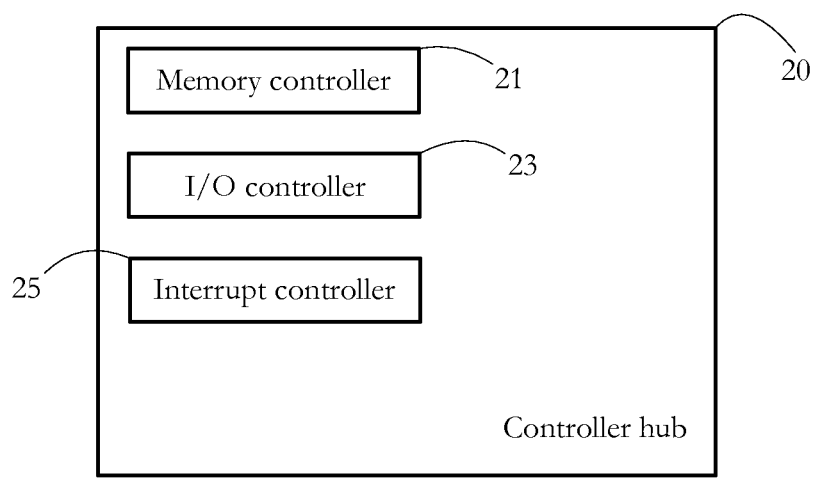
FIG. 3 illustrates exemplary components of a controller hub according to some embodiments of the present invention.

Controller hub 20 represents the plurality of system, peripheral, and/or chipset buses, and/or all other circuitry enabling the communication between processor 22 and devices 24, 26, 28, 32, and 34. FIG. 3 shows exemplary components of controller hub 20, such as a memory controller 21, an input/output (I/O) controller 23, and an interrupt controller 25. Depending on hardware manufacturer, some or all of devices 21, 23, and 25 may be incorporated into a single integrated circuit, and/or may be integrated with processor 22. In some embodiments, some other devices, such as graphics adapters forming part of output devices 28, may be also integrated with processor 22.

Memory controller 21 may oversee communication between processor 22 and memory unit 24. In some embodiments, for instance using Intel® chipsets, memory controller 21 may comprise the northbridge. In other embodiments, for instance in smartphone hardware platforms designed according to the ARM® specification, memory controller 21 may comprise a memory management unit (MMU), among others. I/O controller 23 generically represents the circuitry and signal logic components enabling the data flow between processor 22 and peripheral devices, such as input, output, storage, and network devices, among others. In some embodiments, such as a typical computer chipset, I/O controller 23 includes the southbridge, peripheral component interconnect (PCI) bus and/or low pin-count (LPC) bus of a typical computer chipset. Interrupt controller 25 generically represents circuitry and logic configurable to manage interrupt signals transmitted between processor 22 and devices 24, 26, 28, 32, and 34, among others.

In some embodiments, guest VM 50 executes a guest operating system (OS) 54, an anti-malware (AM) application 58, and possibly other applications, generically represented by application 56. Such applications may include word processing, image processing, media player, database, calendar, personal contact management, browser, gaming, voice communication, and data communication applications, among others. Guest OS 54 comprises software that provides an interface to the (virtualized) hardware of client VM 50, and acts as a host for computing applications 56-58. Guest OS 54 may comprise any widely available operating system such as Windows®, MacOS®, Linux®, iOS®, or Android™, among others.

Figure 4:
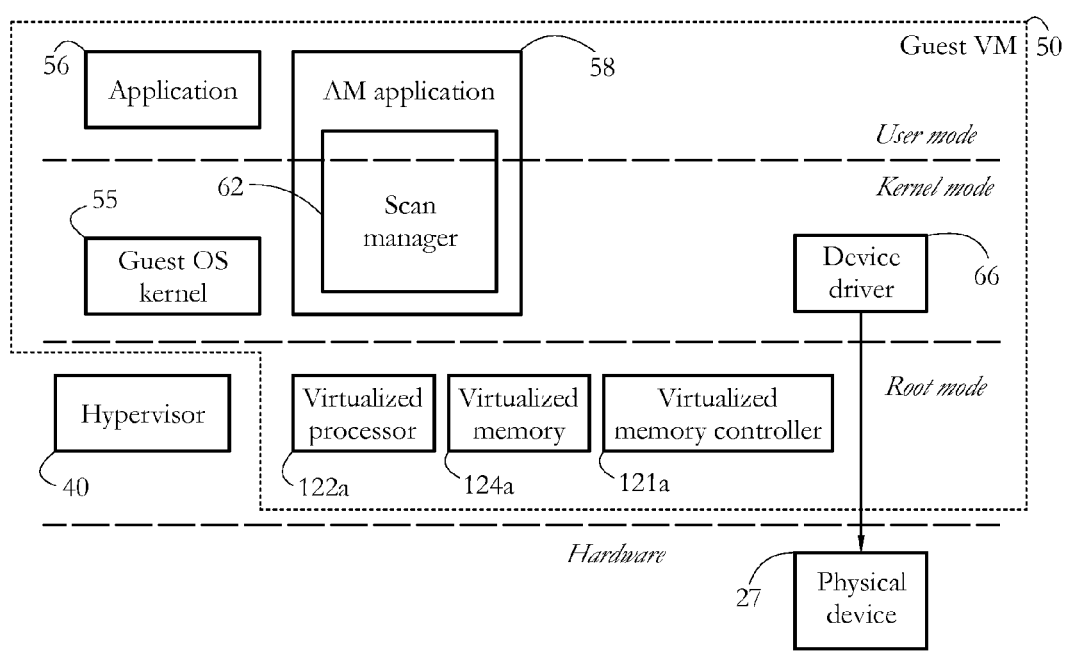
FIG. 4 shows an exemplary set of software objects forming the guest virtual machine in some embodiments of the present invention.

FIG. 4 shows exemplary components of guest VM 50 according to some embodiments of the present invention. FIG. 4 is represented from the perspective of processor privilege levels, also known in the art as layers or protection rings. In some embodiments, each such layer or protection ring is characterized by a set of instructions, which a software object executing at the respective processor privilege level is allowed to execute. When a software object attempts to execute an instruction, which is not allowed within the respective privilege level, the attempt may trigger a processor event, such as an exception, a fault, or a virtual machine exit event. In some embodiments, switching between privilege levels may be achieved via a set of dedicated instructions. Such exemplary instructions on Intel® platforms include SYSCALL/SYSENTER, which switch from user mode to kernel mode, SYSRET/SYSEXIT, which switch from kernel mode to user mode, VMCALL, which switches from either user or kernel mode to root mode, and VMRESUME, which switches from root mode to either kernel or user mode.

In some embodiments, hypervisor 40 takes control of processor 22 at the most privileged level (e.g., VMXroot on Intel® platforms supporting virtualization, and also known as ring −1 or root mode), and creates a hardware virtualization platform presented as client VM 50 to other software executing on host system 10. In some embodiments, the hardware virtualization platform comprises a virtualized processor 122a, a virtualized memory unit 124a, and a virtualized memory controller 121a, among others. Virtualized devices 121a, 122a, and 124a may comprise software executing in root mode and providing a representation of hardware devices 21, 22, and 24 of host system 10, respectively (see e.g., FIGS. 2-3). In some embodiments, hypervisor 40 executes in a configuration known in the art as a thin-layer hypervisor, wherein hypervisor 40 only virtualizes a relatively small subset of hardware devices of host system 10, while allowing guest VM 50 to access other devices directly. For instance, in FIG. 4, a generic physical device 27, such as an input device, graphics adapter, or network adapter, does not have a virtualized embodiment executing within guest VM 50, but is instead accessed directly by guest OS 54 via, e.g., a device driver 66. Configurations allowing OS 54 to access device 27 without a virtualization layer are sometimes referred to in the art as pass-through, and may be implemented using, for instance, VT-d® technology from Intel®.

Most components of guest OS 54, such as OS kernel 55 and device driver 66, execute at lesser processor privilege than hypervisor 40 (e.g., in ring 0 on Intel® platforms, or kernel mode). Exemplary application 56 executes at lesser processor privilege than OS kernel 55 (e.g., in ring 3, or user mode).

In some embodiments, parts of AM application 58 may execute in user mode, while other parts may execute in kernel mode within client VM 50. Exemplary components executing in user mode may include, among others, a graphical user interface (GUI) displaying information such as security alerts to a user of host system 10, and allowing the user to configure a set of options of AM application 58. Components executing in kernel mode may include, among others, a driver and an AM filter configured to detect certain actions performed by a target object executing within client VM 50, such as opening a file, or editing a registry key. AM application 58 may further include a scan manager 62 configured to exchange data with hypervisor 40, and to oversee malware scanning of target objects. Such overseeing may include, among others, selecting target objects for scanning, intercepting events which trigger malware scanning, and launching scanning threads or scanning routines into execution, as shown further below.

In some embodiments, each virtual container (VC) 52a-b represents a pseudo virtual machine set up and managed by hypervisor 40 to conduct malware scanning operations on behalf of anti-malware application 58. In some embodiments, virtual containers 52a-b have only a minimal set of virtualized devices, not including a virtualized processor and virtualized peripheral devices, such as virtualized input/output/network adapters. Such a configuration is shown in FIG. 5-A, wherein a VC 52 has a virtualized memory unit 124b and a virtualized memory controller 121b, but no virtualized processor. In an alternative embodiment shown in FIG. 5-B, VC 52 explicitly includes a virtualized processor 122b, but lacks storage or peripheral devices.

Virtual container 52 (FIG. 5-A-B) further comprises a malware scanner 60 and a target buffer 64, among others. In some embodiments, scanner 60 comprises executable code configurable to scan a target object for malware, and may implement any malware detection method known in the art. For instance, scanner 60 may be configured to determine whether the target object performs a malware-indicative action, and/or to determine whether the target object comprises a malware indicative signature. In some embodiments, beside executable code, malware scanner 60 may comprise various non-executable data enabling malware scanning, such as signature databases, among others. Malware scanner 60 is mapped to a section of virtualized memory 124b, as shown below. Beside executable and non-executable data of malware scanner 60, VC 52 further comprises a set of temporary scan data 68 mapped to virtualized memory 124b, scan data 68 comprising dynamical data used by a thread executing malware scanner 60 (e.g., call stack and heap used by the respective thread, memory pages needed to return results and logs to AM application 58).

In some embodiments, target buffer 64 is a virtual object capable of storing a memory image of a target object selected for malware scanning Target buffer 64 is therefore a placeholder for the target object within VC 52. An exemplary target buffer 64 comprises a section of virtual or virtualized physical memory of VC 52, reserved for the target object. Such memory sections are usually contiguous, the reserved memory space being composed of multiple pages with consecutive addresses. In some embodiments, target buffer 64 can have a substantial size (e.g. a few gigabytes), even though target objects selected for malware scanning are typically much smaller. From the perspective of computational speed, reserving a large buffer to fit any size of target object may be preferable to dynamically allocating memory for each target object upon malware scanning.

To contrast the configuration illustrated in FIG. 1-A, FIG. 1-B shows an exemplary software configuration used in conventional anti-malware systems not using hardware virtualization. In such conventional systems, an operating system 154 directly controls the hardware of the host system, and executes at the highest processor privilege level. An AM application 158, including a malware scanner 160, executes on OS 154, typically using a combination of kernel-mode and user-mode modules. Malware scanner 160 may be configurable to scan a target object for malware. OS 154 typically configures and manages memory, so that scanner 160 executes within a memory domain set up and/or controlled by OS 154. In contrast, in some embodiments of the present invention, each instance of malware scanner 60a-b executes within a memory domain of a virtual container 52a-b (FIG. 1-A), the respective memory domain set up by hypervisor 40 to be isolated from a memory domain controlled by OS 54. In some embodiments, memory isolation comprises not allowing a software object executing within a VC (e.g., VC 52a) to access either the memory domain of another VC (e.g., VC 52b), or the memory domain of guest VM 50. For instance, a software object executing within VC 52a is not allowed to read, write, or execute contents of a page located within the memory domain of VC 52b, or contents of a page located within the memory domain of guest VM 50. In some embodiments, memory isolation further ensures that a software object executing within VC 52a cannot alter the flow of execution of another software object executing within VC 52b or guest VM 50 (e.g. cannot starve the other object of execution resources, cannot change the order in which instructions of the other object are executed, and cannot alter the input or output of the other object). Such memory isolation is enforced from below the operating system, i.e. from a level with higher processor privileges than OS 54.

Figure 6:
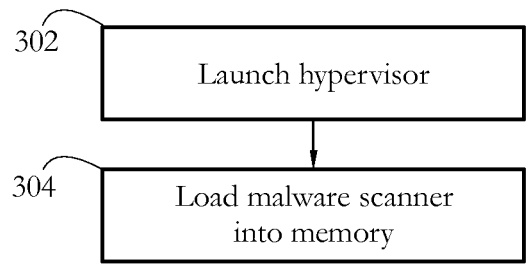
FIG. 6 shows an exemplary sequence of steps performed by the anti-malware (AM) application in FIG. 1-A to set up the guest VM and virtual container(s) according to some embodiments of the present invention.

FIG. 6 shows an exemplary sequence of steps performed by AM application 58 to set up guest VM 50 and a set of virtual containers, such as VCs 52a-b in FIG. 1-A. In a sequence of steps 302-304, AM application 58 launches hypervisor 40 and loads malware scanner 60 into memory. The order of execution of steps 302-304 may differ among embodiments. Steps 302-304 may be carried out, for instance, as part of an installation/launch of AM application 58 on host system 10, while OS 54 is already booted. In an alternative embodiment, OS 54 is booted onto a platform already executing hypervisor 40, in which case, in step 302, AM application 58 only needs to establish a communication channel with hypervisor 40.

Loading malware scanner 60 into memory effectively prepares scanner 60 for execution. In some embodiments, AM application 58 may instruct OS 54 to mark memory pages containing code and/or data of malware scanner 60 as non-swappable, to ensure that the contents of the respective pages is permanently present in RAM. In response to loading scanner 60 into memory, some embodiments of AM application 58 may send a signal to hypervisor 40, the signal indicating that scanner 60 has been loaded into memory. An exemplary signal may comprise an address of a memory page containing executable code of scanner 60. The address may be used by hypervisor 40 to write-protect the respective page, as shown below.

Figure 7:
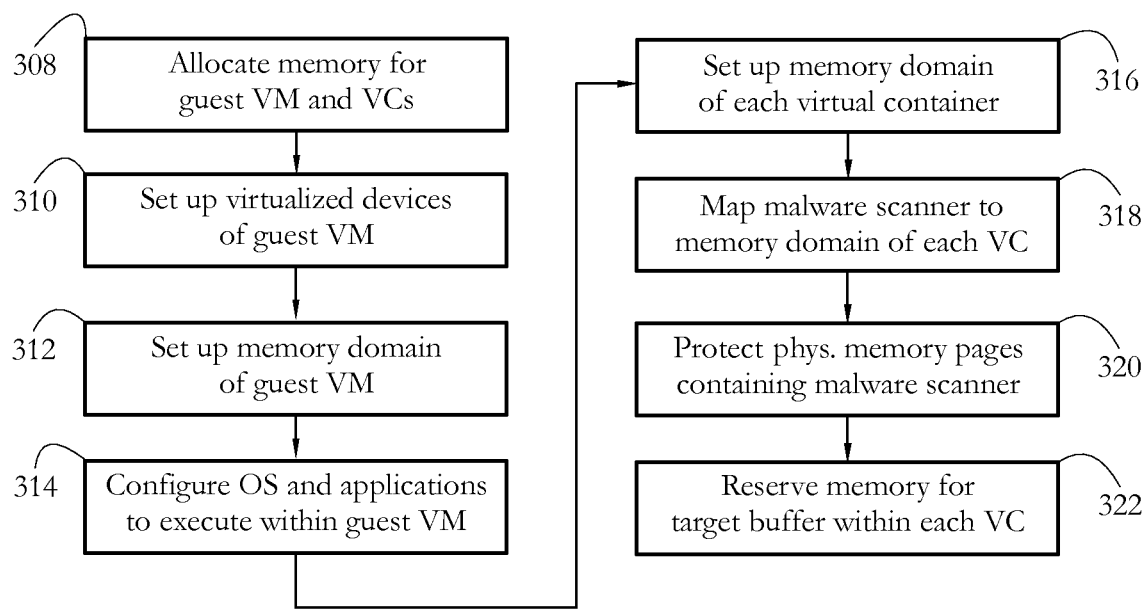
FIG. 7 shows an exemplary sequence of steps performed by the hypervisor in FIG. 1-A to set up the guest VM and virtual container(s) according to some embodiments of the present invention.

FIG. 7 shows an exemplary sequence of steps performed by hypervisor 40 to set up guest VM 50 and virtual container(s) VCs 52a-b, according to some embodiments of the present invention. In response to application 58 launching hypervisor 40 (step 302 in FIG. 6), in a step 308, hypervisor 40 allocates memory for guest VM 50 and the respective virtual containers, for instance by reserving a section of physical memory 24 for VM 50 and each VC. The number of VCs set up on host system 10 may be predetermined and host-independent, or may be determined by hypervisor 40 according to hardware particularities of host system 10. In one exemplary embodiment, hypervisor 40 may set up one VC for each CPU core of host system 10. Alternatively, hypervisor 40 may reserve only a subset of CPU cores of host system 10 for malware scanning, and set up one VC for each core of the subset of CPU cores. In such embodiments, OS 54 may force a scanning thread to execute on one of the subset of cores reserved for malware scanning, for instance in response to AM 58 setting the CPU affinity of the respective thread to the respective core. In some embodiments, the size of the memory section allocated to each VC is determined so as to allow the setup and management of the memory domain of the respective VC, as well as the execution of malware scanner 60. For instance, the section of physical memory allocated to each VC may be sized to store page tables used to configure the memory domain of the respective VC, and temporary scan data 68 needed to execute malware scanner 60 (e.g., stack and heap space).

In some embodiments, a sequence of steps 310-314 sets up guest VM 50. Step 310 enables software and data structures representing a set of virtualized devices, such as a virtualized processor and virtualized memory controller. In some embodiments, in step 310, hypervisor 40 may configure a set of data structures used to manage VM 50 and/or its virtual processor(s). In host systems having Intel VT®-enabled processors, such data structures are named Virtual Machine Control Structures (VMCS), while in embodiments using AMD-V®-enabled processors, they are known as a Virtual Machine Control Blocks (VMCB). Each VMCS/VMCB may store data used to describe the state of each virtual processor executing on host system 10.

A step 312 sets up a memory domain of guest VM 50. Virtual machines typically operate with a virtualized physical memory, i.e., a virtual representation of the actual, physical memory 24 of host system 10. Virtualized physical memory, also known as guest-physical memory, comprises a contiguous space of virtualized addresses, specific to each VM executing on host system 10, with parts of said space mapped to sections of physical memory 24 and/or of physical storage 32. In systems supporting virtualization, such mapping is known as a second level address translation (SLAT), and is typically achieved using dedicated data structures used by processor 22, such as extended page tables (EPT) on Intel platforms, or nested page tables (NPT) on systems having AMD processors. In such systems, virtualized physical memory is partitioned in units known in the art as pages, a page representing the smallest unit of virtualized physical memory individually mapped to physical memory via mechanisms such as EPT and/or NPT, i.e., mapping between physical and virtualized physical memory is performed with page granularity. All pages typically have a predetermined size, e.g., 4 kilobytes, 2 megabytes, etc. The partitioning of virtualized physical memory is usually configured by hypervisor 40. In some embodiments, hypervisor 40 also configures the EPT/NPT and therefore the mapping between physical memory and virtualized physical memory, for each VM executing on host 10. In some embodiments, a pointer to the EPT/NPT is stored within a VMCS/VMCB structure used to manage a virtual processor of the respective VM.

Following the launch of hypervisor 40, OS 54 is presented with the virtualized memory space configured for VM 50, instead of physical memory space 24. In some embodiments, OS 54 further configures a virtual memory space (also termed logical address space) and exposes the respective virtual memory space to an application such as applications 56 and/or 58 in FIG. 1-A. In such systems, OS 54 configures and maintains a mapping between such virtual memory spaces and the virtualized physical memory of VM 50, for instance using a page table mechanism. In some embodiments, virtual memory spaces configured by OS 54 are also partitioned into pages, wherein a page represents the smallest unit of virtual memory individually mapped to virtualized physical memory by OS 54 (virtual to virtualized physical memory mapping is performed with page granularity).

Figure 8:
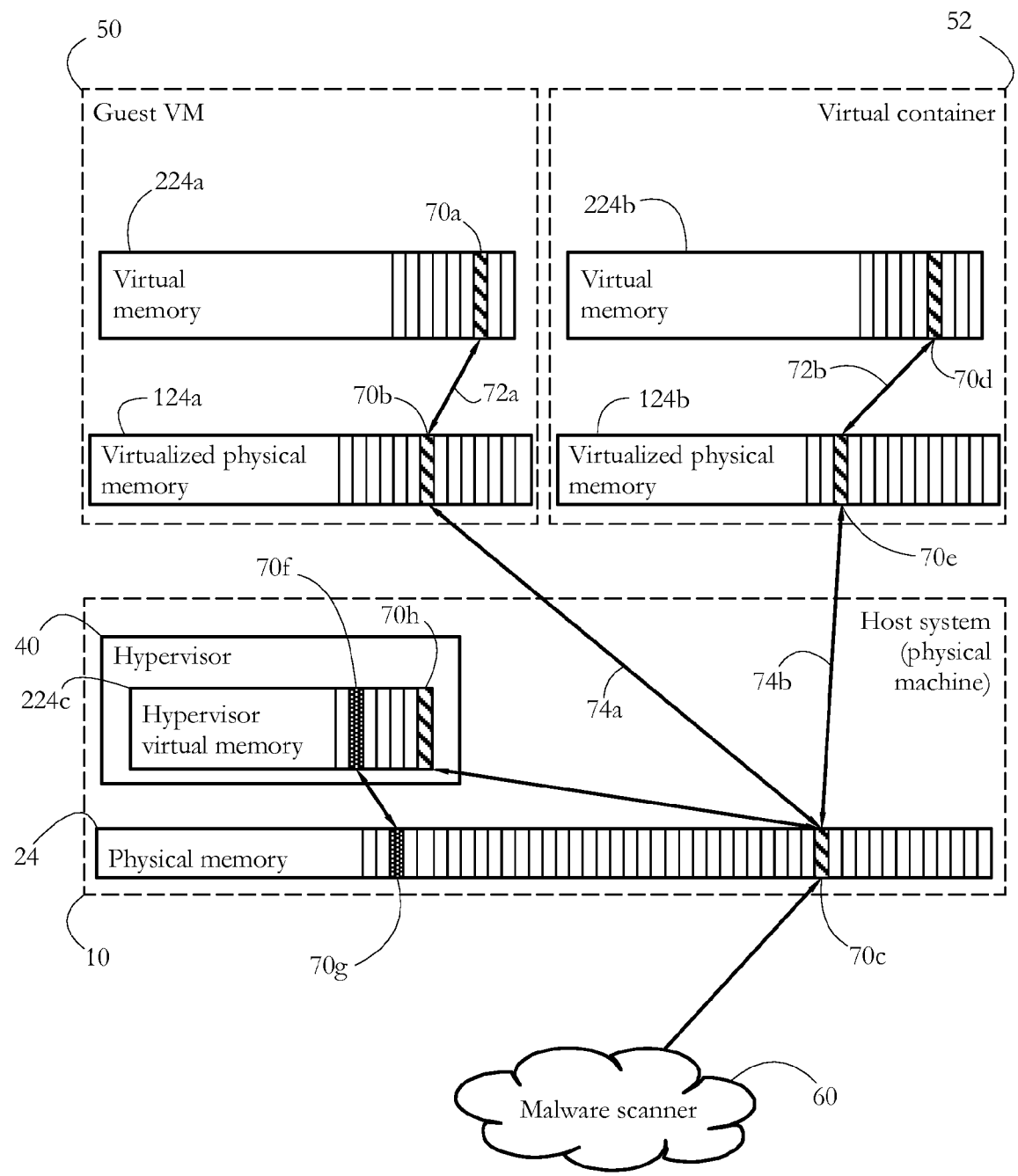
FIG. 8 illustrates an exemplary mapping of a malware scanner to a memory domain of a virtual container, according to some embodiments of the present invention.

FIG. 8 illustrates an exemplary memory mapping in an embodiment as shown in FIG. 1-A. AM application 58 is assigned a virtual memory space 224a by guest OS 54. When application 58 attempts to access an exemplary page 70a, a virtual address of page 70a is translated by the virtualized processor of guest VM 50 into an address of a page 70b located within a virtualized physical memory space 124a of VM 50, via a virtual-to-virtualized physical translation 72a. Translation 72a may be determined according to page tables configured and controlled by guest OS 54. Hypervisor 40, which configures and controls virtualized physical memory 124a, then maps the address of page 70b to an address of a page 70c located within physical memory 24 of host system 10, via a virtualized-physical-to-physical translation 74a. Translation 74a may be specified, for instance, as one or more entries of an EPT/NPT structure of VM 50.

In some embodiments, a memory domain of VM 50 includes a virtualized physical memory space used by VM 50 and/or a virtual memory space used by an application executing within VM 50 (e.g., spaces 124a and 224a in FIG. 8). The memory domain of VM 50 may be enabled via memory maps comprising virtual-to-virtualized-physical and/or virtualized-physical-to-physical address translations, such as translations 72a and 74a in FIG. 8. For instance, the memory domain of guest VM 50 may be enabled by configuring an EPT/NPT structure used to manage VM 50.

In some embodiments, hypervisor 40 sets up its own virtual memory space 224c comprising a representation of physical memory 24, and employs a translation mechanism (for instance, page tables) to map addresses in space 224c into addresses in physical memory 24. In FIG. 8, such an exemplary mapping translates an address of a page 70f into an address of a page 70g in physical memory 24. Similarly, an address of a page 70c in physical memory 24 correspond to an address of a page 70h within virtual memory space 224c of hypervisor 40.

In a step 314, hypervisor 40 may configure OS 54 and applications such as 56 and 58 to execute within the virtual environment of guest VM 50. In some embodiments, step 314 includes booting OS 54 while revealing to OS 54 a set of virtualized devices instead of the actual physical devices of host system 10. In other embodiments, wherein OS 54 is already booted at the time of execution of step 314, hypervisor 40 may displace OS 54 to guest VM 50 by changing the way OS 54 interacts with the hardware of host system 10, i.e., forcing OS 54 to interface with hardware via virtual devices configured in steps 310-312. In step 314, hypervisor 40 may further displace operations of OS 54 to a lower processor privilege level.

In some embodiments, a sequence of steps 316-322 may set up each VC. A step 316 sets up a memory domain for the respective VC, isolated from the memory domain of any other VC on host system 10, and from the memory domain of guest VM 50. Such isolation ensures that each VC is only aware of its own memory space, and therefore cannot access a memory space used by another VC or by guest VM 50. Such isolation may be enforced using memory virtualization techniques. For instance, in step 316, hypervisor 40 may create a virtualized memory space comprising a representation of physical memory 24 and may present the respective virtualized memory space to the respective VC.

Figure 9:
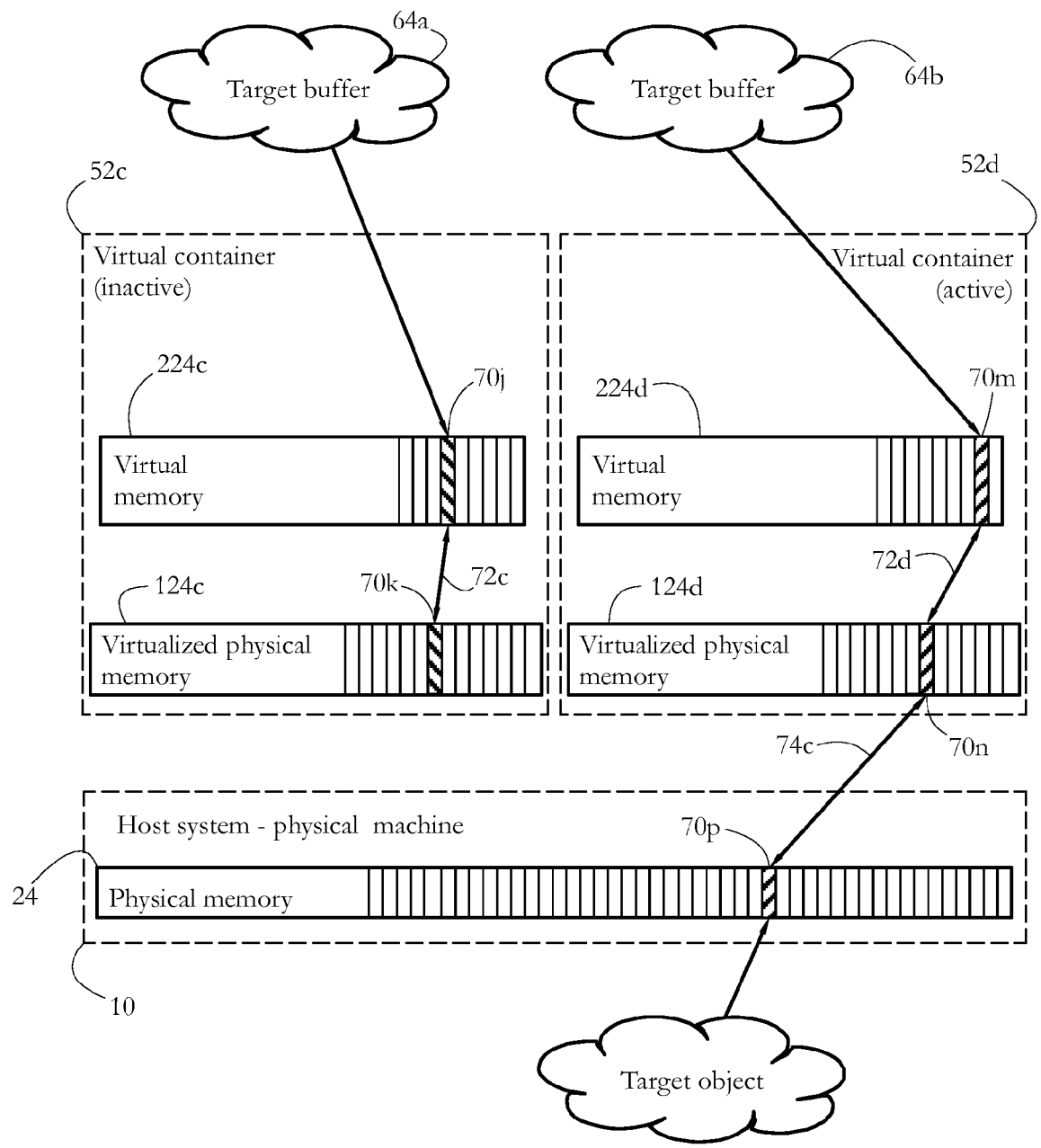
FIG. 9 illustrates an exemplary mapping of a target buffer and target object according to some embodiments of the present invention.

FIG. 9 illustrates exemplary memory domains and memory mappings set up for two virtual containers 52c-d, such as VCs 52a-b of FIG. 1-A. In some embodiments, a memory domain of VC 52c has a virtualized physical memory space 124c, and a virtual memory space 224c, while a memory domain of VC 52d includes spaces 124d and 224d. The memory domain of each VC may be implemented via an EPT/NPT data structure used by the respective VC to perform virtual-to-virtualized-physical and/or virtualized-physical-to-physical address translations. In some embodiments, virtual-to-virtualized-physical translations (e.g. page tables setup using CR3 on Intel® platforms) can also be employed to further limit or particularize the memory domain. Spaces 124c-d and/or 224c-d may be dimensioned by hypervisor 40 and/or AM application 58 to store an instance of malware scanner 60, including temporary scan data 68, and a target buffer 64a-b, respectively.

In a step 318, hypervisor 40 may map malware scanner 60 into the memory domain of each virtual container. In some embodiments, mapping scanner 60 into the memory domain of a VC comprises creating a memory image of scanner 60 within the virtual and/or virtualized-physical memory space(s) of the respective VC. In the example illustrated in FIG. 8, loading malware scanner 60 by AM application 58 loads an image of scanner 60 into physical memory 24. Exemplary page 70c contains a part of the respective image, e.g., executable code or data used by malware scanner 60. Address translation 74a, set up by hypervisor 40 using e.g. an EPT/NPT entry, maps page 70c to page 70b within virtualized physical memory space 124a used by guest VM 50. Translation 72a set up by guest OS 54 further maps page 70b to a page 70a within virtual memory space 224a used by AM application 58.

In some embodiments, mapping malware scanner 60 into the memory domain of VC 52 comprises setting up an address translation 74b mapping page 70c to a page 70e within virtualized physical memory space 124b used by VC 52. In some embodiments, step 318 further comprises setting up an address translation 72b mapping page 70e to a page 70d within virtual memory space 224b used by malware scanner 60 when executing inside VC 52. Address translations 74b and/or 72b may be set up, for instance, by writing an entry indicative of the respective translation into a page table such as the EPT/NPT of VC 52. When more than one VC was set up in step 308, hypervisor 40 may map page 70c to a page located within the virtualized physical memory space of each such VC, by writing an entry indicative of the respective address translation into the EPT/NPT of the respective VC. Thus, each VC will have an instance of malware scanner 60 mapped to its respective memory domain.

Some hardware configurations allow hypervisor 40 to selectively control access to data stored within each page of physical memory 24, e.g., by setting read and write access rights to the respective page. Such rights may be set, for instance, by modifying an entry of the respective page within the EPT/NPT. Hypervisor 40 may thus select which software object may access data stored at the addresses within each page, and may indicate which operations are allowed with the respective data, e.g., read, write, etc. An attempt by a software object to perform an operation, such as reading data from, or writing data to a page to which the object does not have the respective right, may trigger a virtual machine exit event (e.g. a VMExit event on Intel platforms). In some embodiments, virtual machine exit events transfer control of the processor from the VM executing the respective software object to hypervisor 40, thus preventing the unauthorized read/write attempt. In other host systems, an attempt to access a protected page may generate a hardware exception, known in the art as a virtualization exception (#VE on Intel platforms). Such virtualization exceptions may not generate a virtual machine exit event, but instead may intercept the attempt and alert a component executing within the respective VM (e.g., AM application 58).

In some embodiments, in a step 320, hypervisor 40 may write-protect the memory image of malware scanner 60 loaded by AM application 58, for instance by marking memory pages storing executable code and/or data used by scanner 60 as non-writable in the EPT/NPT used by guest VM 50. Such protection may prevent unauthorized modifications of scanner 60, for example by malware executing within guest VM 50. In some embodiments, write-protecting the memory image of malware scanner 60 comprises setting up a copy-on-write mechanism, wherein any attempt to modify the content of a page storing a part of malware scanner 60 may result in redirecting the attempt to a copy of the respective page. Such configurations may facilitate legitimate modifications of scanner 60, such as software updates, without affecting currently-executing instances of scanner 60.

In a step 322, hypervisor 40 may reserve memory for the target buffer within the memory domain of each VC. In some embodiments, each target buffer is a placeholder for a target object to be scanned for malware; step 322 ensures that enough memory space is set aside for such target objects. In the example of FIG. 9, pages 70k and 70n are reserved for target buffers 64a-b, respectively, within virtualized physical memory spaces 124c and 124d, respectively. In some embodiments, step 322 may further comprise setting up address translations mapping virtual pages to virtualized physical pages reserved for buffers 64a-b (e.g., translations 72c-d in FIG. 9). Such mapping may expedite malware scanning, by preparing the placeholder to receive a target object. As shown below, address translations such as 74c, actually mapping the target object onto a target buffer, are only configured upon execution of malware scanner 60.

Completing the steps illustrated in FIG. 7 prepares guest VM 50 and virtual containers for performing anti-malware operations. FIG. 10 shows an exemplary sequence of steps performed by AM application 58 to actually carry out such anti-malware operations according to some embodiments of the present invention. A sequence of steps 332-334 waits for the occurrence of a scan trigger event. Exemplary scan trigger events include a user's attempting to execute a software object and/or to access a disk file (on-access scanning). Another exemplary scan trigger event is a user's requesting a malware scan of a target object, or of a content of a storage device, such as a hard drive partition or a flash drive (on demand scanning). Another example of a scan trigger event includes a software object performing a possibly malware-indicative action, such as editing a registry of OS 54 or issuing a system call, for instance. Yet another exemplary scan trigger event is a network adapter(s) 34 receiving an incoming communication packet. Another example of trigger event is loading a HTTP document in a browser. Intercepting such trigger events may be achieved by scan manager 62 (FIG. 4) using any technique known in the art, such as hooking certain OS functions, dynamic-linked library (DLL) injection, and using various filter drivers (e.g. file system minifilters and network traffic filters on Windows platforms), among others.

When a scan trigger event has occurred, in a step 336, scan manager 62 may identify a target object indicated by the trigger event. In an on-demand scanning scenario, the target object may be indicated by the user (e.g., a disk file). In other scenarios, the target object may be the object (e.g. application, process, or file) currently being launched or accessed, or a network packet currently being received. In some embodiments, the target object may reside on a storage device (e.g., hard disk), or may comprise a content of a set of memory pages.

In a step 338, scan manager 62 may configure malware scanner 60 to scan the target object. Such configuration may include, for instance, selectively activating a subset of components of scanner 60 according to a type of target object, and/or instantiating a set of parameters of malware scanner 60 with values determined according to the target object. Next, in a step 340, scan manager 62 may launch malware scanner 60.

Scanner 60 executes within a CPU thread, herein referred to as the scanning thread. In one exemplary scenario, such as an on-demand scanning situation, the scanning thread is launched by scan manager 62 in step 340. Alternatively, in some embodiments, scan manager 62 manages a pool of dormant pre-configured scanning threads, and selectively activates one to execute scanner 60. In another exemplary scenario, such as on-access scanning, the scanning thread is already executing when AM detects the scan trigger event. In one such example, a user is attempting to open a Microsoft Word® file. The application issues an application programming interface (API) call to open the respective file. The API call is intercepted by a component of scan manager 62, such as a file system minifilter, and is identified as a scan trigger event. In response to intercepting the API call, scan manager 62 launches malware scanner 60 to scan the respective file for malware. In this case, scanner 60 executes within the CPU thread previously executing Microsoft Word®, i.e., the already running CPU thread becomes a scanning thread.

FIG. 11 shows an exemplary sequence of steps performed by hypervisor 40 to carry out malware scanning of the target object according to some embodiments of the present invention, wherein virtual containers do not feature a virtualized processor (e.g., FIG. 5-A). In a step 342, hypervisor 40 intercepts an event indicative of the launch of the scanner 60. One such exemplary event is the execution by scanner 60 of a privileged processor instruction, which transfers control of processor 22 from guest VM 50 to hypervisor 40 via a virtual machine exit event. In another embodiments, detecting the launch of malware scanner 60 may be achieved by hooking certain OS functions performing operations such as thread scheduling, and configuring the respective hooks to transfer execution to a component of hypervisor 40.

In a step 344, hypervisor 40 may select a VC to host the scanning thread from the set of VCs configured in the initialization phase (e.g., steps 308 and 316-322 in FIG. 7). Next, a step 346 performs a cleanup of the selected container, to erase any data that may remain within the respective VC from previous use. Step 346 may include, for instance, erasing the content of memory pages allocated for temporary scan data 68 (e.g., call stack and heap data from previous operation of scanner 60). Such cleanup may prevent malware from storing executable code within the respective pages between consecutive executions of malware scanner 60, and therefore prevent the transfer of any persistent data between consecutive scans performed within the same VC.

In a step 348, hypervisor 40 maps the target object to the target buffer of the selected VC. Step 348 may comprise establishing an address translation mapping a memory page containing data of the target object to a virtualized memory page reserved for the target buffer within the memory domain of the selected VC. In the example of FIG. 9, page 70*n* within the memory domain of VC 52*d* was set up to hold a part of target buffer 64*b*, while physical page 70*p* holds data of the target object. In step 348, some embodiments may configure an address translation 74*c*, for instance by writing translation 74*c* into the EPT/NPT used by VC 52*d*. By configuring such address translations, step 348 effectively maps the target object into the memory domain of the selected VC.

In a step 350, hypervisor 40 switches the memory context of the scanning thread from the memory domain of guest VM 50 to the memory domain of the selected VC. In some embodiments, step 350 comprises assigning a set of page table structures (e.g., EPT/NPT) used by the selected VC to the scanning thread. Re-assigning page tables in such a manner causes the scanning thread to execute within the memory context of the selected VC, i.e., to perform address translation according to page tables configured for the selected VC instead of according to page tables configured for guest VM 50. In some embodiments, step 350 comprises changing an address of a page table structure (e.g., an EPT pointer on Intel® platforms, known in the art as EPTP) within a VM control structure of guest VM 50, to point to a page table structure configured for the selected VC. In another exemplary embodiment, scanner 60 may employ a dedicated processor instruction, such as VMFUNC on Intel platforms, to change the memory context of the scanning thread without a VM exit to hypervisor 40. In such cases, hypervisor 40 pre-configures the respective page table structures, so that a call to VMFUNC from within guest VM 50 performs the appropriate memory domain switch without further assistance from hypervisor 40.

A sequence of steps 352-354-355 executes malware scanner 60 on the virtual processor of guest VM 50 (e.g., device 122*a* in FIG. 4), until the scan finishes or an interrupt is detected. Thread execution may be interrupted by a variety of processor events, commonly termed interrupts. Exemplary interrupts include hardware interrupts from peripheral devices (network adapters 34, input devices 26, etc.), inter-processor interrupts (IPI), and system timer interrupts, among others. In conventional computer systems, interrupts are serviced by the operating system. In some embodiments of the present invention, the scanning thread executes within the context of a virtual container, which may lack an interrupt controller and an operating system, and as such may be unable to service interrupts. Therefore, in some embodiments, interrupts are intercepted by hypervisor 40. When an interrupt occurs, in a step 356, hypervisor 40 may switch the memory context of the scanning thread from the memory domain of the selected VC to the memory domain of guest VM 50. Step 356 may comprise changing an address of a page table, e.g., EPT, within the VM control structure of guest VM 50. The memory context switch allows guest OS 54 to service the interrupt.

After servicing an interrupt, the operating system typically continues the execution of the interrupted thread. In some embodiments, in a step 358, hypervisor 40 intercepts an event indicating a return to execution of the scanning thread. When such an event is intercepted, in a step 360, hypervisor 40 switches the memory context of the scanning thread to the memory context of the selected VC and resumes execution of malware scanner 60 (step 352 above). To carry out step 358, hypervisor 40 may use any method known in the art, for instance hooking an OS function configured to handle hardware interrupts.

When the scanning thread finishes executing, in a step 357, hypervisor 40 may communicate a verdict of the scan to AM application 58, for instance by writing an indicator of the verdict to a section of memory shared between hypervisor 40 and guest VM 50.

Addressing hardware interrupts via the mechanism described above (steps 352-360 in FIG. 11-A) may place a computational burden on host system 10. In some embodiments, malware scanning may be optimized by adjusting the CPU scheduling of the scanning thread to minimize interrupts. For instance, a preferred CPU of host system 10 may be pre-assigned by hypervisor 40 to handle hardware interrupts from system timers and peripheral devices such as network adapters 34, which may form the majority of interrupts. Meanwhile, scanning threads may be preferentially scheduled to execute on other CPUs. Such configurations may reduce the number of interruptions to scanning threads, thus accelerating malware scanning.

An alternative embodiment addressing the issues of isolated scanning and interrupt handling comprises a virtual container with a virtualized processor (e.g., illustrated as device 122*b* in FIG. 5-B). In such embodiments, each of guest VM 50 and virtual container 52 operates a distinct, non-shared virtual CPU. In contrast, in the example shown above in relation to FIG. 11-A, virtual processor 122*a* is shared between guest VM 50 and VC 52.

FIG. 11-B shows an exemplary sequence of steps performed by hypervisor 40 in an embodiment wherein scanning instructions are executed by a virtualized processor of the VC. Steps 362-368 mirror the actions performed by hypervisor 40 in steps 342-348 of FIG. 11-A, respectively. In a sequence of steps 370-372, hypervisor 40 may suspend the execution of the scanning thread by the virtualized processor of guest VM 50 (e.g., device 122*a* in FIG. 4), and execute malware scanner

60 on the virtualized processor of the selected VC (e.g., device 122b in FIG. 5-B). Moving the execution of scanner 60 from guest VM 50 to the selected VC implicitly also includes switching from the memory domain of guest VM 50 to the memory domain of the selected VC.

A step 372 determines whether malware scanner 60 has finished scanning the target object. When scanner 60 has finished, a sequence of step 374-376 may transmit the scan verdict to guest VM 50 and wake-up the scanning thread executing within guest VM 50. In a sequence of steps 376-378, hypervisor 40 intercepts and routes a hardware interrupt to the virtualized processor of guest VM 50, thus allowing the respective VC to execute unaware of any hardware interrupts occurring during execution of the scanning thread.

The exemplary systems and methods described above allow protecting a host system, such as a computer system or smartphone, from malware such as viruses, worms, and rootkits. In some embodiments of the present invention, installing an anti-malware application on the host system launches a hypervisor executing at the highest processor privilege level, and displaces the operating system to a guest virtual machine. The anti-malware application then collaborates with the hypervisor to configure a set of virtual containers, so that each virtual container operates with a virtualized memory space isolated from the virtualized memory space of another VC, and isolated from the virtualized memory space of the guest virtual machine. Memory isolation is enforced using hardware virtualization techniques, such as exposing distinct page tables to each VC and to the guest VM.

In conventional anti-malware systems, anti-malware software typically executes within a memory domain shared with the operating system and with the target objects being scanned for malware. Such configurations may be particularly vulnerable to malware, since a successful attack on anti-malware software may compromise the operating system of the respective system, and therefore jeopardize all other software executing on the respective system. In contrast, in some embodiments of the present invention, malware scanners execute within the isolated environment of a virtual container, so in the eventuality of a successful malware attack on the malware scanners, the damage is contained to the respective VC and does not spread to the operating system or other applications.

In some embodiments, when a target object is selected for scanning, a CPU thread for scanning the target object is launched by the operating system executing within the guest virtual machine. The hypervisor may then map a memory image of the target object to the memory domain of a selected virtual container, and switch the memory context of the CPU thread performing malware scanning from the memory domain used by operating system to the memory domain of the selected virtual container. Such memory context switching may include re-configuring a pointer to a page table used by the guest virtual machine to point to a page table used by the selected VC, for the duration of the malware scan. Thus, malware scanning software effectively executes within the memory domain of the VC, in isolation from the memory domain used by the operating system.

In some embodiments, instead of installing a copy of the malware scanner within each virtual container, a memory image of the malware scanner is mapped from the memory domain used by the operating system independently to the memory domain of each VC. Such mapping may employ, for instance, a copy-on-write technique to ensure that an instance of the malware scanner mapped to a VC may execute independently of another instance of the malware scanner mapped to another VC. Due to the proliferation of malware, malware scanners may need frequent updates, typically several times a day. Such a one-to-many mapping of the malware scanner, using copy-on-write technology, may have substantial advantages in software upgrade situations. Instead of upgrading scanners executing within each VC, some embodiments may upgrade only the image of the malware scanner held within the memory domain used by the operating system. One-to-many mapping of the malware scanner may then ensure that all VCs receive the upgraded version of the malware scanner, while copy-on-write technology may ensure that any instance of the malware scanner already executing within a VC at the time of the upgrade will not be corrupted by the upgrade.

In conventional anti-malware systems using hardware virtualization technology, anti-malware software may execute within a separate virtual machine, having its own virtualized processor, virtualized interrupt controllers, and operating system, among others. Such configurations may be relatively complex to develop and maintain, and may have a substantial memory footprint within the host system. In contrast, in some embodiments of the present invention, anti-malware software executes within a virtual container, i.e., a pseudo-virtual machine lacking a proper processor, interrupt controller, and operating system. Such configurations may have substantial development, upgrade, and portability advantages over conventional systems. In embodiments wherein the virtual container lacks a virtualized processor, malware scanner software may execute on the virtual processor of the guest VM, but within the memory domain of the virtual container.

Execution of a scanning thread may be interrupted, for instance by hardware interrupts from peripheral devices, scheduling, or inter-processor communication, among others. In some embodiments wherein the respective virtual container lacks a processor and/or interrupt controller, the hypervisor is configured to manage interrupts by passing such interrupts on to the operating system executing within the guest virtual machine. For instance, when a scanning thread is interrupted, the hypervisor may intercept the interrupt, and switch the memory context of the executing thread from the memory domain of the respective VC to the memory domain of the guest VM, thus allowing the operating system to service the interrupt. When the operating system returns to executing the respective thread, the hypervisor may switch the memory context of the thread back to the memory domain of the respective VC.

In an alternative embodiment wherein the VC is configured to have a virtual processor and/or interrupt controller, malware scanning routines may be executed by the virtualized processor of the respective container, and within the memory domain of the respective VC. In such embodiments, the hypervisor may be configured to intercept hardware interrupts, and to route such interrupts for processing by the virtualized processor of the guest VM.

It will be clear to one skilled in the art that the above embodiments may be altered in many ways without departing from the scope of the invention. Accordingly, the scope of the invention should be determined by the following claims and their legal equivalents.

What is claimed is:
1. A host system comprising:
at least one hardware processor configured to execute a hypervisor, the hypervisor configured to expose a guest virtual machine (VM), a first virtual container (VC), and a second VC, wherein exposing the first and second VCs includes setting up a first memory domain for the first VC and a second memory domain for the second VC, the first and second memory domains isolated from each other and from a memory domain of the quest VM, wherein:
  the guest VM is configured to execute a malware scanner on a virtualized processor of the guest VM; and
  the hypervisor is further configured to:
    in response to setting up the first memory domain, map a memory page containing a part of the malware scanner to a first memory page within the first memory domain,
    in response to setting up the second memory domain, map the memory page containing the part of the malware scanner to a second memory page within the second memory domain,
    in response to the guest VM launching a first instance of the malware scanner to determine whether a first target object comprises malware, switch a memory context of the first instance of the malware scanner from the memory domain of the guest VM to the first memory domain, and
    in response to the guest VM launching a second instance of the malware scanner to determine whether a second target object comprises malware, switch a memory context of the second instance of the malware scanner from the memory domain of the guest VM to the second memory domain.

2. The host system of claim 1, wherein the hypervisor is further configured, in response to the guest VM launching the first instance of the malware scanner, to map the first target object to a target buffer within the first memory domain.

3. The host system of claim 1, wherein the hypervisor is further configured to write-protect the memory page containing the part of the malware scanner.

4. The host system of claim 3, wherein write-protecting the memory page containing the part of the malware scanner comprises:
  intercepting an attempt to modify a content of the memory page containing the part of the malware scanner, and
  in response, redirecting the attempt to a duplicate memory page.

5. The host system of claim 1, wherein switching the memory context of the first instance of the malware scanner from the memory domain of the guest VM to the first memory domain comprises configuring the virtualized processor of the guest VM to perform memory address translations according to a page table configured for the first VC.

6. The host system of claim 5, wherein configuring the virtualized processor of the guest VM to perform memory address translations according to the page table configured for the first VC comprises replacing a value of a page table pointer used by the virtualized processor of the guest VM with a new value indicative of the page table configured for the first VC.

7. The host system of claim 1, wherein the hypervisor is further configured, in response to switching the memory context of the first instance of the malware scanner from the memory domain of the guest VM to the first memory domain, to:
  intercept a hardware interrupt occurring during execution of the first instance of the malware scanner, and
  in response to intercepting the interrupt, switch the memory context of the first instance of the malware scanner from the first memory domain to the memory domain of the guest VM.

8. A method comprising:
  employing at least one hardware processor of a host system to execute a hypervisor, the hypervisor configured to expose a guest virtual machine (VM), a first virtual container (VC), and a second VC, wherein exposing the first and second VCs includes setting up a first memory domain for the first VC and a second memory domain for the second VC, the first and second memory domains isolated from each other and from a memory domain of the guest VM;
  in response to setting up the first memory domain, employing the at least one hardware processor to map a memory page containing a part of a malware scanner to a first memory page within the first memory domain;
  in response to setting up the second memory domain, employing the at least one hardware processor to map the memory page containing the part of the malware scanner to a second memory page within the second memory domain;
  employing the at least one hardware processor to launch a first instance of the malware scanner on a virtual processor of the guest VM, to determine whether a first target object comprises malware;
  in response to launching the first instance of the malware scanner, employing the at least one hardware processor to switch a memory context of the first instance of the malware scanner from the memory domain of the guest VM to the first memory domain;
  employing the at least one hardware processor to launch a second instance of the malware scanner on the virtualized processor of the guest VM, to determine whether a second target object comprises malware; and
  in response to launching the second instance of the malware scanner, employing the at least one hardware processor to switch a memory context of the second instance of the malware scanner from the memory domain of the guest VM to the second memory domain.

9. The method of claim 8, further comprising, in response to launching the first instance of the malware scanner, employing the at least one hardware processor to map the first target object to a target buffer within the first memory domain.

10. The method of claim 8, further comprising write-protecting the memory page containing the part of the malware scanner.

11. The method of claim 10, wherein write-protecting the memory page containing the part of the malware scanner comprises:
  intercepting an attempt to modify a content of the memory page containing the part of the malware scanner, and
  in response, redirecting the attempt to a duplicate memory page.

12. The method of claim 8, wherein switching the memory context of the first instance of the malware scanner from the memory domain of the guest VM to the first memory domain comprises configuring the virtualized processor of the guest VM to perform memory address translations according to a page table configured for the first VC.

13. The method of claim 12, wherein configuring the virtualized processor of the guest VM to perform memory address translations according to the page table configured for the first VC comprises replacing a value of a page table pointer used by the virtualized processor of the guest VM with a new value indicative of the page table configured for the first VC.

14. The method of claim 8, further comprising, in response to switching the memory context of the first instance of the malware scanner from the memory domain of the guest VM to the first memory domain:

employing the at least one hardware processor to intercept a hardware interrupt occurring during execution of the first instance of the malware scanner, and in response to intercepting the interrupt, employing the at least one hardware processor to switch the memory context of the first instance of the malware scanner from the first memory domain to the memory domain of the guest VM.

15. A non-transitory computer readable medium storing instructions which, when executed by a hardware processor of a host system, cause the host system to execute a hypervisor, the hypervisor configured to expose a guest virtual machine (VM), a first virtual container (VC), and a second VC, wherein exposing the first and second VCs includes setting up a first memory domain for the first VC and a second memory domain for the second VC, the first and second memory domains isolated from each other and from a memory domain of the guest VM, wherein:

the guest VM is configured to execute a malware scanner on a virtualized processor of the guest VM; and the hypervisor is further configured to:
in response to setting up the first memory domain, map a memory page containing a part of the malware scanner to a first memory page within the first memory domain;

in response to setting up the second memory domain, map the memory page containing the part of the malware scanner to a second memory page within the second memory domain;

in response to the guest VM launching a first instance of the malware scanner to determine whether a first target object comprises malware, switch a memory context of the first instance of the malware scanner from the memory domain of the guest VM to the first memory domain; and in response to the guest VM launching a second instance of the malware scanner to determine whether a second target object comprises malware, switch a memory context of the second instance of the malware scanner from the memory domain of the guest VM to the second memory domain.

* * * * *